(12) United States Patent
Ozawa et al.

(10) Patent No.: US 6,722,614 B2
(45) Date of Patent: Apr. 20, 2004

(54) SATELLITE DEPLOYMENT STRUCTURE

(75) Inventors: Takuo Ozawa, Tokyo (JP); Tsuyoshi Ozaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/218,461

(22) Filed: Aug. 15, 2002

(65) Prior Publication Data

US 2003/0173467 A1 Sep. 18, 2003

(30) Foreign Application Priority Data

Mar. 15, 2002 (JP) .......................... 2002-72774

(51) Int. Cl.[7] .............................. B64G 1/22; B64G 1/00
(52) U.S. Cl. .................. 244/158 R; 244/173; 136/292; 136/245
(58) Field of Search ............................ 52/70–71, 111; 136/292, 245; 244/173, 158 R; 160/135, 229.1, 231.1, 232.2

(56) References Cited

U.S. PATENT DOCUMENTS

| | | | | |
|---|---|---|---|---|
| 3,221,805 A | * | 12/1965 | Miller | 160/229.1 |
| 3,532,299 A | * | 10/1970 | Williamson et al. | 244/173 |
| 3,606,211 A | * | 9/1971 | Roersch et al. | 244/173 |
| 3,627,585 A | * | 12/1971 | Dollery et al. | 244/173 |
| 3,698,958 A | * | 10/1972 | Williamson et al. | 136/245 |
| 3,729,363 A | * | 4/1973 | Mollura | |
| 3,783,029 A | * | 1/1974 | Dillard et al. | 136/245 |
| 4,015,653 A | * | 4/1977 | Slysh et al. | 244/173 |
| 4,394,529 A | | 7/1983 | Gounder | |
| 4,988,060 A | * | 1/1991 | Janson et al. | 244/173 |
| 5,473,122 A | | 12/1995 | Kodiyalam et al. | |
| 5,620,529 A | * | 4/1997 | Bassily et al. | 244/173 |
| 5,961,738 A | * | 10/1999 | Benton et al. | 136/245 |
| 5,994,640 A | | 11/1999 | Bansemir et al. | |
| 6,161,664 A | | 12/2000 | Brevart et al. | |
| 6,168,116 B1 | * | 1/2001 | Renshall et al. | 244/173 |
| 6,284,967 B1 | * | 9/2001 | Hakan et al. | 136/245 |
| 6,423,895 B1 | * | 7/2002 | Murphy et al. | 136/245 |
| 6,478,261 B2 | * | 11/2002 | Laraway et al. | 244/173 |
| 6,609,683 B2 | * | 8/2003 | Bauer et al. | 244/173 |

OTHER PUBLICATIONS

QuakeSat Team, Dec. 18, 2001, Stanford University,Preliminary Design Review, pp. 19–34.*

* cited by examiner

Primary Examiner—Michael J. Carone
Assistant Examiner—L. Semuwegus
(74) Attorney, Agent, or Firm—Leydig, Voit & Mayer, Ltd.

(57) ABSTRACT

In a solar array paddle having panels which are connected to a main body of a satellite and rotatably connected to one another, elastic insertion members for prevention of vibration are disposed in a clearance between each of the panels and between the main body and the panel adjacent to the main body when the panels are housed, folded, and layered. Each of the insertion members for prevention of vibration is inserted into the clearances and between the main body of the satellite and the panels adjacent to the main body such that one surface contacts a first panel and the other surface is adhered to a second panel.

10 Claims, 2 Drawing Sheets

SATELLITE DEPLOYMENT STRUCTURE

BACKGROUND OF THE INVENTION

1. Field of the Invention

This invention relates to a satellite deployment structure such as a solar array paddle, a radiator panel, an antenna, or the like, to be mounted on a satellite.

2. Description of Related Art

A satellite deployment structure has a plurality of panels which are connected to a satellite structure. Each of the panels is movably connected to another panel by means of hinges, or the like. Prior to launching a rocket, the panels are housed in the satellite with the panels folded and layered. After launching the rocket, the panels are deployed during an orbit to function as a part of the satellite in space.

FIGS. 3A and 3B are schematic explanatory drawings showing the structure of a conventional solar array paddle 11 which is known as one of the satellite deployment structures, and show the solar array paddle 11 when it is being housed. FIG. 3A is a perspective view showing the uppermost panel of the solar array paddle 11 when it is being housed. FIG. 3B is a side view showing the entire solar array paddle 11 as seen from the direction D in FIG. 3A. Here, the lower part of FIG. 3A is the side connected to a satellite structure (not shown). In FIGS. 3A and 3B, hatching to show the sectioned surfaces is partly omitted.

Referring to FIGS. 3A and 3B, reference numeral 11 denotes the solar array paddle, reference numeral 12 four folded panels, reference numeral 13 hinges which movably connect the panels 12 together, reference numeral 14 a yoke which connects the satellite structure and the panel adjacent to the satellite structure, reference numeral 15 a launch lock which fixes and holds the panels together, as well as the satellite structure and the panel 12 adjacent thereto. The holding lock 15 is provided in two positions, in the neighborhood of the center of the panel 12 as well as in four positions therearound, i.e., in six positions in total.

The operation of the conventional satellite deployment structure will be described.

Each of the panels 12 of the solar array paddle 11 is mounted on the rocket, folded and connected to the satellite structure (not shown) and is launched. After launching, the holding locks 15 are released in an orbit by a releasing mechanism (not shown), whereby each of the panels 12 is deployed. The deployment of the panels 12 in space is thus finished, and the solar array paddle 11 functions as a part of the satellite.

The conventional solar array paddle as one of the satellite deployment structures thus constituted as described above entails the following problems.

Namely, in order to prevent a resonance with very large vibrations that occurs at the time the rocket is launched, an increased characteristic frequency of the solar array paddle is essential.

On the other hand, since the rocket has a limited volume and weight lifting ability, the thickness of each panel of the solar array paddle must preferably be thin as possible. Regrettably, the thinner the panel is, the higher the characteristic frequency of the solar array paddle.

In order not to make the characteristics frequency higher when the thickness of the panel is made as thin as possible, there is a way of increasing in the number of holding locks for fixing and holding in position the panels when the panels are being housed, i.e., of increasing the number of positions for fixing the panels.

However, since the holding locks are to be released during the orbiting of the satellite, the number of the releasing mechanisms inevitably increases in correspondence with the number of the holding locks, resulting in an increase in weight to be mounted on the rocket.

Further, since the panels are not deployed unless all of the holding locks have been released, as increase in the number of the holding locks possibly lowers the reliability of the deployment of the panels.

SUMMARY OF THE INVENTION

The present invention has been made to solve the above and other problems and an object thereof is to provide a satellite deployment structure in which the characteristics frequency can be made higher without increasing the number of holding locks even if the thickness of the panels is made thinner as far as possible.

In order to attain the above and other objects, a satellite deployment structure according to the present invention is provided with a plurality of insertion members for prevention of vibration disposed in a clearance between each of the panels and in that between a main body of a satellite and the panel adjacent to the main body when the panels are being housed with them folded and layered.

According to the present invention, when the panels are being housed with them folded and layered, a plurality of elastic members for prevention of vibration are disposed in the clearance between each of the panels and in that between the main body of the satellite and the panel adjacent to the main body. Therefore, even if the thickness of the panels is made thinner as much as possible, there is provided a satellite deployment structure in which the characteristics frequency can be made higher without increasing the number of the holding locks. At the same time, the satellite deployment structure which is capable of reducing the vibration response can be provided.

The above and other objects and the attendant advantages of the present invention will become readily apparent by reference to the following detailed description when considered in conjunction with the accompanying drawings wherein:

BRIEF DESCRIPTION OF THE DRAWINGS

Throughout the figures, the same reference numerals, and characters, unless otherwise noted, are used to denote like features, elements, components, or portions of the illustrated embodiment.

DETAILED DESCRIPTION OF PREFERRED EMBODIMENTS

The description of the preferred embodiments of the present invention will now be described in detail with reference to the attached drawings.

First Embodiment

Figure 1A:
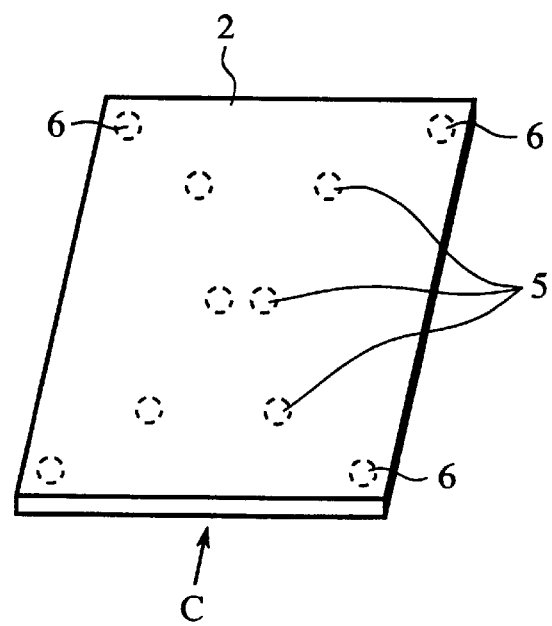
FIGS. 1A and 1B are schematic explanatory drawings showing the arrangement of a satellite deployment structure according to a first embodiment of the present invention.
Figure 1B:
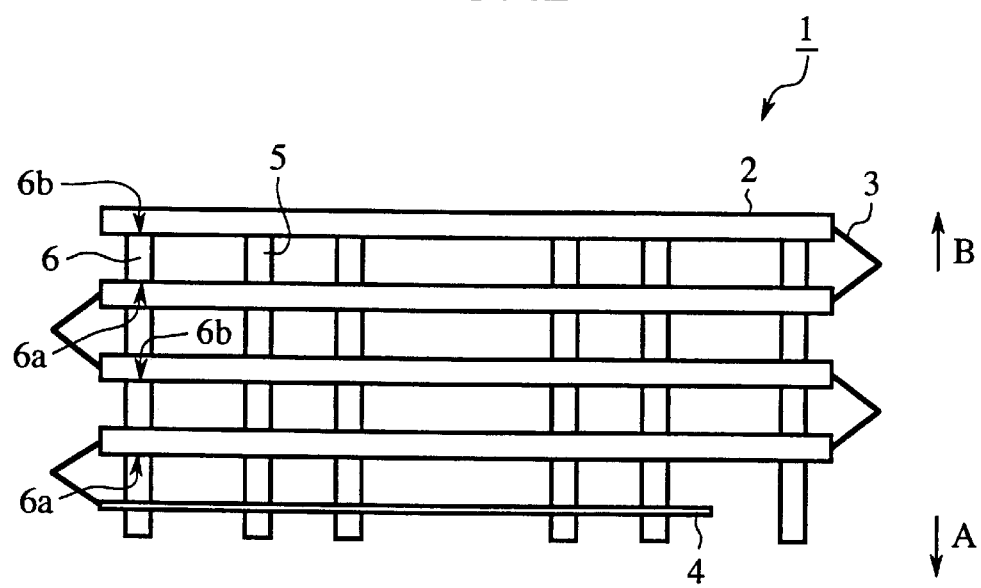

FIG. 1 is a schematic drawing showing the arrangement of a satellite deployment structure according to the first embodiment of the present invention and shows a state of a solar array paddle 1 when it is being housed, FIG. 1A is a perspective view showing the uppermost panel of the solar array paddle 1 when it is being housed and FIG. 1B is a side view showing the whole of the solar array paddle 1 as viewed from the direction of C in FIG. 1A.

In FIGS. 1A and 1B, arrow A points to the downward direction of FIG. 1B and the side connected to a satellite structure (not shown), and arrow B points to the upward direction of FIG. 1B and is opposed to the direction of arrow A. Reference numeral 1 denotes a solar array paddle (a satellite deployment structure), reference numeral 2 four folded panels and reference numeral 3 hinges for movably connecting panels 2 together. Reference numeral 4 denotes a yoke for connecting together the satellite structure to the panel 2 adjacent thereto. Reference numeral 5 denotes a holding lock for fixing and holding together the panels 2 of the solar array paddle when it is being housed, and for fixing and holding together the satellite structure and the panel 2 adjacent thereto. The holding lock 5 is provided, in the first embodiment, in two positions at the center of the panel 2 and in four positions at the periphery thereof, i.e., in six positions in total.

Reference numeral 6 denotes an insertion member for prevention of vibration which is inserted into the clearance between the respective panels 2 as well as into that between the satellite structure and the panel 2 adjacent thereto. The insertion members for prevention of vibration 6 are made of an elastic material such as rubber, or the like, so that it absorbs the sounds and vibrations at the time a rocket is launched, makes higher the characteristic frequency of the satellite cell paddle 1, and reduces the vibration response. Reference numeral 6a denotes the surface of the insertion members for prevention of vibration 6 which face to the direction indicated by arrow A and reference numeral 6b the surface of the members for prevention of vibration 6 which face to the direction indicated by arrow B. Here, let the insertion members for prevention of vibration 6 to be adhered to the satellite structure and to the panel 2 only on one side of the insertion members for prevention of vibration 6. For example, when only the surface 6a indicated by arrow A is adhered to the satellite structure and to the panel 2, the surface 6b indicated by arrow B is not adhered to the panel 2 but is only in contact therewith. The adhesion of only one side of the insertion members for prevention of vibration 6 freely deploy the panels 2 on an orbit after launching the rocket. In addition, since the surface 6a of the insertion members for prevention of vibration 6 indicated by arrow A remains adhered to the satellite structure as well as to the respective panel 2 after the deployment of the panels 2, the insertion members for prevention of vibration 6 will not go afloat into the space.

The operation of the satellite deployment structure of the first embodiment will be described.

Each of the panels 2 of the solar array paddle 1 is mounted on the rocket with them folded and connected to the satellite structure (not shown), and is launched. After launching, each of the holding locks 5 is released on the orbit by a releasing mechanism (not shown). At the same time, as a result of release of the contact surface 6b of the insertion members for prevention of vibration 6 from each of the panels 2, they are deployed. In this manner, the deployment of the panels 2 in the space is finished, so that the solar array paddle 1 functions as a part of the satellite.

An embodiment of the first embodiment will then be described. Table 1 shows the results of vibration tests (No. 1–No. 5) performed under varying conditions using both the solar array paddle 1 of the first embodiment and the conventional solar array paddle 11. No. 1 through No. 3 are results with the solar array paddle 1 and No. 4 and No. 5 with the conventional solar array paddle 11.

TABLE 1

|  | Number of launch lock | Insertion Member for prevention of vibration | Material of Insertion Member for prevention of vibration | Characteristic frequency [Hz] | Vibration Response [G] | Remarks |
| --- | --- | --- | --- | --- | --- | --- |
| No. 1 | 6 | 4 | Silicon Rubber | 100 | 10.5 | Present Invention |
| No. 2 | 6 | 4 | Acrylic Rubber | 98 | 11.6 | Present Invention |
| No. 3 | 6 | 4 | Epoxy Rubber | 96 | 10.9 | Present Invention |
| No. 4 | 6 | 0 | — | 78 | 6.3 | Prior Art |
| No. 5 | 10 | 0 | — | 102 | 9.8 | Prior Art |

The panels used in the tests are all sandwiched panels whose skins are made of a carbon-fiber-reinforced plastic and whose core is made of aluminum. The dimensions of each panel are 2600 mm in long, 1800 mm in width and 26 mm in thick, and the number of panels is four.

In tests No. 1 through No. 4, a solar array paddle is used, which is provided with the holding locks 5 in six positions in the same manner as with FIG. 1A. Test No. 5 used a solar array paddle provided with the holding locks in four positions in the neighborhood of the center of the panel and in six positions therearound, i.e., in ten positions in total. In addition, the vibrating preventing insertion member has dimensions of 25 mm in length and width, and of 15–17 mm in thickness. As a material for the insertion member for prevention of vibration, a silicone rubber is used in test No. 1, an acrylic rubber in test No. 2, and an epoxy rubber in test No. 3. These three kinds of rubbers suffer from a small amount of decrease in weight due to its degassing characteristics in vacuum and are known to be suitable as materials for use in the space.

The vibration response of the solar array paddle at this time is detected with an accelerometer and the frequency with high vibration response is obtained as the characteristic frequency of the panel.

The vibration tests are carried out at a room temperature (25° C.), and let the vibrating conditions to be 2.1 G in exciting acceleration, 4 oct/min in sweeping speed, and 10–200 Hz in frequency range.

As is clear from Table 1, the results of vibration tests No. 1 through No. 3 with the solar array paddle 1 according to the first embodiment in which the insertion member for prevention of vibration is inserted revealed that characteristic frequency is about 100 Hz and vibration response is about 10 G. The result of test No. 4 with the conventional solar array paddle 11 proves that characteristic frequency is 78 Hz and the frequency response is 63 G. Therefore, it can be seen from the results that, by using the solar array paddle 1 according to the first embodiment, the characteristic frequency increases by about 20 Hz and the vibration response is kept to about ⅙. On the other hand, the result of test No. 5 in which the holding locks are used in ten positions turns out that the characteristic frequency is 102 Hz and the vibration response is 9.8 G. Therefore, it can be seen from the result that they exhibit equivalent values to those of the results in tests No. 1 through No. 3. In other words, it may be safely said that the insertion members for prevention of vibration 6 contribute, like the holding lock 5, to an increase in the characteristic frequency of the solar array paddle and also to a decrease in the vibration response.

Figure 2:
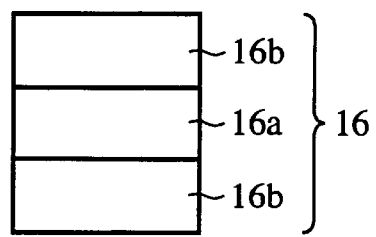
FIG. 2 is a schematic view showing the arrangement of an insertion member for prevention of vibration of the satellite deployment structure according to a second embodiment of the present invention.

As described above, according to the solar array paddle 1 of the first embodiment, there are provided the insertion members for prevention for vibration 6 which are inserted into the clearance between the respective panels 2 as well as into that between the satellite structure and the panel 2 adjacent thereto. Therefore, a solar array paddle is provided whose characteristic frequency can be made higher without increasing the number of the holding locks 5, even if the thickness of the panel 2 is minimized as far as possible, Second Embodiment FIG. 2 is a schematic diagram showing the arrangement of a insertion member for prevention of vibration 16 for a satellite deployment structure according to the second embodiment of the present invention. The insertion member for prevention of vibration 16 is a layered product made up by stacking a plurality of different materials. Here, a three-layer structure is taken as an example. In FIG. 2, reference numeral 16a denotes a first member, which is made of rubber and forms a center of the insertion member for prevention of vibration 16. Reference 16b denotes a second member which sandwiches the first member 16a and is made of metal, plastic, or a carbon-fiber-reinforced plastic each with a modulus of elasticity different from that of the rubber.

By using the insertion member for prevention of vibration 16 of a layered product made up of the first member 16a and the second members 16b as described above, the following effects can be obtained. Namely, by forming the insertion member for prevention of vibration into a layered product with rubber using a material with high modulus of elasticity such as metal, or the like, it is possible to prevent the insertion member for prevention of vibration from giving rise to buckling due to the vibrations at the time of launching. In addition, by forming the insertion member for prevention of vibration into a layered product with metal, or the like, with a modulus of elasticity different from that of the rubber, it allows the insertion member for prevention of vibration to be adjusted to an adequate modulus of elasticity.

An embodiment of the second embodiment will then be described. Vibration tests (a–d) similar to those as with the first embodiment are carried out using the insertion member for prevention of vibration 16.

The insertion member for prevention of vibration of the solar array paddle used in the tests "a" through "d" adopt the following materials. Namely, in each of the tests, the first member 16a is made of a silicone rubber of 25 mm in length and width, and 5 mm in thickness. The second member 16b is made of a material of 25 mm in length and width and 5 mm in thickness with a modulus of elasticity different from that of the rubber. As the second member 16b, aluminum is used in test "a", titanium in test "b", epoxy resin in test "c", and a carbon-fiber-reinforced plastic in test "d".

As a result, in any one of the vibration tests "a" through "d", it is possible to increase the characteristic frequency and decrease the vibration response in the same manner as with the case where the tests are carried out using the conventional solar array paddle 11 having 10 holding locks in the vibration test No. 5 in the first embodiment.

As described above, according to the second embodiment, the insertion member for prevention of vibration 16 is made of a layered product of rubber and a material with a modulus of elasticity different from that of the rubber. This exerts the same effects as those in the first embodiment. In addition, the insertion member for prevention of vibration 16 is prevented from giving rise to buckling due to vibrations at the time of launching. Still further, the insertion member for prevention of vibration 16 is adjustable to an adequate modulus of elasticity.

In the second embodiment, the insertion member for prevention of vibration 16 in a layered product of three-layer structure is taken as an example. However, as a matter of course, the number of stacking may be increased.

Further, in the second embodiment, the description is made about the insertion member for prevention of vibration 16 of a layered member which is made by sandwiching rubber by a material with a different modulus of elasticity from that of the rubber. However, needless to say, an insertion member for prevention of vibration 16 made by sandwiching the rubber by a material with a modulus of elasticity different from that of the rubber may be used.

Third Embodiment

A solar array paddle (a satellite deployment structure) according to the third embodiment of the present invention will be described with reference to FIGS. 1A and 1B for convenience' sake. In the third embodiment, the insertion members for prevention of vibration 6 are inserted into positions where vibration mode has its antinode, i.e., into positions where amplitude becomes maximum, when the panels 2 are subjected to vibrations having characteristic frequency with them folded without the vibrating prevention insertion member.

An embodiment of the third embodiment will then be described. Vibration tests (1) and (2) are performed under the conditions that the positions into which the insertion members for prevention of vibration 6 are to be inserted are changed and that others are just the same as those in the first embodiment.

Figure 3A:
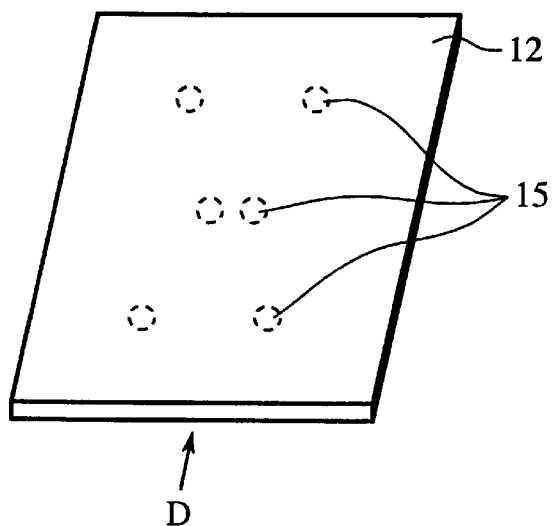
FIGS. 3A and 3B are schematic drawings showing the arrangement of a conventional satellite deployment structure.
Figure 3B:
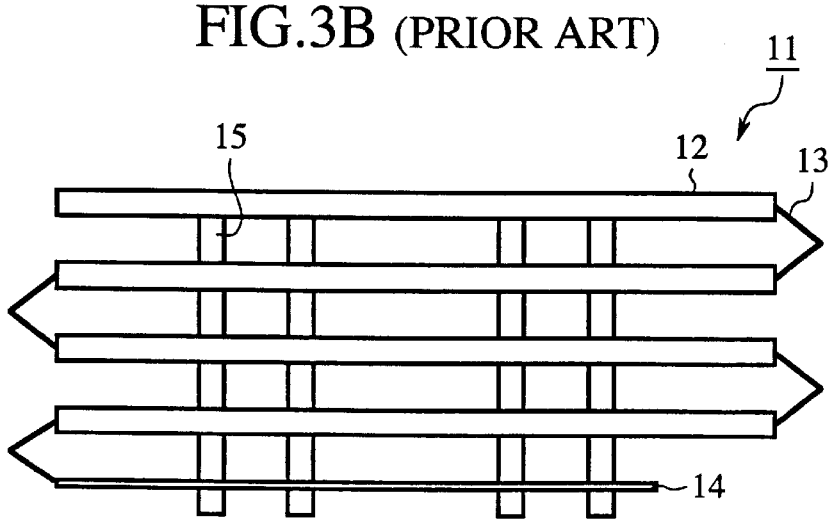

First, the positions where vibration mode has its antinode are checked with the panels 2 folded without the insertion members for prevention of vibration 6, i.e., by subjecting the conventional panels 12 of the solar array paddle 11 shown in FIG. 3 to an arbitrary characteristic frequency. The check reveals that such positions are found to be in the vicinity of the four corners of each of the panels 12.

Test (1) is a vibration test using the solar array paddle 1 in which insertion members for prevention of vibration 6 are inserted into four corners of the panel where antinode of vibration mode appears at the arbitrary characteristic frequency of the solar array paddle 11. On the other hand, test (2) is a vibration test using the solar array paddle 1 in which elastic members are inserted into the neighborhood of the center of the panel where antinode of vibration mode does not appear.

The test (2) proves that both the characteristic frequency and the vibration response are substantially the same as those in the case where the insertion members for prevention of vibration 6 are not inserted, i.e., substantially the same as the results in test No. 4 of the first embodiment. On the other hand, the test (1) turns out the increased characteristic frequency and the decreased vibration response which are both equivalent to those in No. 1 or No. 5 of the first embodiment.

As described above, according to the solar array paddle of the third embodiment, the insertion members for prevention of vibration 6 are inserted into the positions where vibration mode has its antinode when an arbitrary characteristic frequency is given to the panels 2 with the panels 2 folded without the insertion members for prevention of vibration 6, i.e., into the four corners of each of the panels 2. This exerts the same effects as that in the first embodiment.

Fourth Embodiment

A solar array paddle (a satellite deployment structure) according to the fourth embodiment of the present invention will be described with reference to FIGS. 1A and 1B for convenience' sake. In the fourth embodiment, the panels 2 are arranged to be subjected to a forced displacement so that a compressive load is applied to the insertion members for prevention of vibration 6 when the panels 2 are being housed. Here, the insertion members for prevention of vibration 6 whose thickness is larger than the clearance between the panels 2 when the panels 2 are being housed as well as that between the satellite structure and the panel 2 adjacent to the satellite structure are disposed in predetermined positions of the deployed panels 2 and of the satellite structure. Thereafter, the panels 2 are folded and sandwiched to give a forced displacement of about 1–2 mm to themselves.

An embodiment of the fourth embodiment will then be described. A forced displacement of about 1–2 mm is given to the panels 2 so as to apply a compressive load to the insertion members for prevention of vibration 6. Tests are in turn performed by increasing the exciting acceleration to 2.1 G, 4.2 G and 6.3 G. The other conditions are the same as those in the first embodiment.

As a result, in any one of the exciting accelerations, the insertion members for prevention of vibration 6 and the panels 2 are by no means detached from each other during the vibration test. This further increases the characteristic frequency and further decreases the vibration response as compared with the results of No. 1 through No. 3 in the first embodiment.

As described above, according to the solar array paddle in the fourth embodiment, a forced displacement is given to the panels 2 so as to apply a compressive load to the insertion members for prevention of vibration 6. This exerts the same effects as that in the first embodiment.

Fifth Embodiment

A solar array paddle (a satellite deployment structure) of the fifth embodiment of the present invention will be described with reference to FIGS. 1A and 1B for convenience' sake. In the fifth embodiment, the magnitude of forced displacement to be given to the panels 2 in the fourth embodiment is set. Specifically, in the state where the panels 2 are folded without the insertion members for prevention of vibration 6, the forced displacement is set to a value larger than the amplitude of each of the panels when an arbitrary characteristic frequency is given to the panels 2.

An embodiment of the fifth embodiment will be described. Amplitudes are checked at the primary characteristic frequency and at the secondary characteristic frequency when vibrations are given at exciting frequencies of 2.1 G, 4.2 G, 6.3 G, 8.4 G and 10.5 G, respectively, to the solar array paddle with the panels 2 folded without the insertion members for prevention of vibration 6 so as to apply a compressive load to the insertion members for prevention of vibration 6. Forced displacement larger than that of the above-described amplitudes is given to the panels 2. The method of giving the forced displacement followed that of the fourth embodiment. Other than the above, vibration tests are performed on the solar array paddle of the fifth embodiment thus made as described above under the same conditions as those in the first embodiment.

As a result, in any one of the exciting accelerations, the insertion members for prevention of vibration 6 and the panels 2 are by no means detached from each other during the vibration tests. This further increases the characteristic frequency and further decreases the vibration response as compared with the results of No. 1 through No. 3 in the first embodiment.

As described above, according to the solar array paddle of the fifth embodiment, the magnitude of forced displacement is set to a value larger than the amplitude of each of the panels when vibrations having arbitrary natural frequencies are given to the panels 2 with the panels 2 folded without the vibrating prevention insertion members 6. This exerts the same effects as that in the first embodiment.

In each of the above-described embodiments, a silicone rubber, an acrylic rubber and an epoxy rubber are used as the rubber without being restricted thereto. However, other rubbers may be used.

Further, even if several pieces of the insertion member for prevention of vibration used in each of the above-described embodiments may be replaced by holding locks 5.

Still further, in each of the above-described embodiments, a solar array paddle is used as the satellite deployment structure. A satellite deployment structure such as a radiator panel, an antenna, or the like may be used.

It is readily apparent that the above-described satellite deployment structure meets all of the objects mentioned above and also has the advantage of wide commercial utility. It should be understood that the specific form of the invention herein above described is intended to be representative only, as certain modifications within the scope of these teachings will be apparent to those skilled in the art.

Accordingly, reference should be made to the following claims in determining the full scope of the invention.

What is claimed is:

1. In a satellite deployment structure having a plurality of panels which are connected to a main body of a satellite and which are rotatably connected to one another, a plurality of elastic insertion members for prevention of vibration disposed in clearances between each of the panels and between the main body and a panel adjacent to the main body when the panels are folded.

2. The satellite deployment structure according to claim 1, wherein each of the insertion members for prevention of vibration is inserted into the clearance between each of the panels and between the main body of the satellite and the panels adjacent to the main body such that a first surface of each of the insertion members for prevention of vibration contacts a panel and a second surface is adhered to another panel.

3. The satellite deployment structure according to claim 1, wherein the elastic insertion members for prevention of vibration are rubber.

4. The satellite deployment structure according to claim 1, wherein the elastic insertion members for prevention of vibration are at least one selected from the group consisting of silicone rubber, acrylic rubber, and epoxy rubber.

5. The satellite deployment structure according to claim 1, wherein each of the insertion members for prevention of vibration is a layered product including a first member of rubber and a second member of a material with a modulus of elasticity which is different from that of the rubber.

6. The satellite deployment structure according to claim 5, wherein the second member is at least one selected from the group consisting of metal, plastic, and a material of carbon fiber and plastic.

7. The satellite deployment structure according to claim 1, wherein the insertion members for prevention of vibration are disposed in positions where an amplitude of vibration becomes maximum when the panels are subjected to vibrations of an arbitrary characteristic frequency with the panels folded without the insertion members for prevention of vibration between the panels.

8. The satellite deployment structure according to claim 1, wherein the panels, when folded, are subjected to a forced displacement and apply a compressive load to the insertion members for prevention of vibration.

9. The satellite deployment structure according to claim 8, wherein the forced displacement is generated by sandwiching the insertion members for prevention of vibration having a thickness larger than the clearance between each of the panels and between the main body of the satellite and the panel adjacent to the main body.

10. The satellite deployment structure according to claim 8, wherein magnitude of the forced displacement is larger than an amplitude of vibration of each of the panels when the panels are subjected to vibrations of an arbitrary characteristic frequency with the panels folded and without said insertion members for prevention of vibration placed between the panels.

* * * * *